UNITED STATES PATENT OFFICE 2,278,468

LEGUME

Albert Musher, New York, N. Y., assignor, by mesne assignments, to Food Manufacturing Corporation, Chicago, Ill., a corporation of New York No Drawing. Application July 7, 1939, Serial No. 283,193

5 Claims. (Cl. 99—98)

The present application relates to food products and it particularly relates to legumes and to procedures for producing softer, or more quickly disintegratable, or more quick cookable qualities therein. Legumes, such as various types of beans or peas, for instance, particularly when they are in relatively dry form have a hardness or toughness that requires long cooking or soaking procedures to enable edibility or utilization for general culinary use.

It is, further, quite difficult for the usual explosion procedure to produce the desired quick cookability in these products, particularly without harming various of their qualities or characteristics due to the generally high temperature and pressure conditions required.

Also, the starch, and generally the relatively high starch content that is contained within many of these legumes tends to harden, particularly upon standing, and particularly after heat, steam, or gelatinization is produced in the explosion operation. There is therefore produced a product, which, although it has been exploded, nevertheless exhibits a hardness and toughness, at least in various portions thereof, so as to reduce the desired degree of quick cookability. This starch may be present in amounts over 8% to 10%, for example, or in amounts over 20% to 25%, or even in amounts over 35% to 40%, based upon the dry weight of the legume.

Still further, the hardness or toughness of legumes is produced or intensified by the action of dehydration, heat, moisture, and various other factors, upon the protein materials that are contained within these legumes, and particularly when the protein materials are present in larger amounts.

Generally, these protein materials, as, for instance, legumin, legumelin, phaseolin, vicilin, etc., may be present in amounts ranging over 5% to 10%, or even over 15% to 20%, based upon the dry weight of the legume. These materials tend to become very hard, cake, or coagulate, or otherwise result in a toughened or resinous structure when they are subjected to various factors. For instance, as water is removed from these proteins so as to leave very little moisture present, as for example, by dehydration, there is produced characteristic hardness and toughness. Apparently, also, this hardness is developed within the legume in its naturally dry condition, or after the usual single explosion treatment.

Because of the solid compactness or hardness of the legumes of this invention, it is difficult for the usual explosion procedure to produce the disruption and softening quality substantially throughout the material so as to result in a uniformity of the quick cooking quality substantially throughout the entire structure of the legume.

It is therefore among the objects of the present invention to provide legumes with substantially improved quickly cookable quality and with substantially less harm to the edibility and food quality of the legumes than heretofore resulted.

It is still further an object of the present invention to produce originally relatively high water content legumes as for instance legumes having a water content over 30% to 35% or even over 50% to 60%, in a dry, or dehydrated condition whereby there will not be necessary the usual long procedures of soaking and cooking, but whereby there will be enabled substantially quicker cookability.

It is also a further object of the present invention to produce legumes in a more quickly cookable condition but without the usual burnt flavor or other undesired or harmed edibility or food value that normally results when the usual high temperatures and pressures are utilized in accord with the usual explosion procedure.

Still further objects and advantages will appear in the more detailed description set forth below, it being understood, however, that this more detailed description is given by way of illustration and explanation only, and not by way of limitation, since various changes therein may be made by those skilled in the art without departing from the scope and spirit of the present invention.

It has now been found that the above objects may be accomplished by various procedures as will be disclosed herein, as for example, the following procedures or combinations thereof:

1. Partially or wholly converting the starch that is present within the legume into a relatively non-caking material, or into a more easily removable material, or removing the starch or converted material therefrom by washing, soaking, hydrolyzing with acid or enzymes, etc., or other procedures so as to reduce the tendency towards hard or tough formations, so as thereby not to require the usual excessive explosion procedures. For example, the starch-containing material may be heated in a mild acid solution, or it may be treated with a diastatic enzyme so as to convert at least a portion of the starch into sugar which may be allowed to remain therein, but which preferably may be washed out with water.

2. Partially or wholly converting the protein material that is present within the legume into a relatively non-toughening product, or converting it into a more easily removable material, or removing the protein material or converted product by various procedures such as soaking, washing, or treating with salt water or other materials. Another procedure that may be used, for example, is to change the insoluble proteins into soluble proteins, or into amino acids, and then remove these. Aside from the methods given herein these various procedures may, in various cases, be augmented or produced by hydrolyzing the protein containing material with acid, alkali, or enzymes, etc., or by passing an electric current through a solution containing the protein-containing material, said solution being of the proper pH, or said solution being adjusted to the isoelectric point, or, generally, within required ranges away from this point. Also, various proteolytic enzymes as for instance, trypsin, pepsin, papain, and so forth, may be used to hydrolyze the protein material. These procedures may be utilized or controlled so as to enable resultant products which will not be of the usual toughened formation, particularly when dried, or which thereby will not require the usual excessive explosion procedures.

3. Subjecting the legumes which have been treated so as to reduce their hardening or toughening quality, as described in #1 or #2 above, to a single explosion procedure, and generally to a single explosion procedure at substantially lower temperatures and pressures than heretofore necessary for the legumes that have not been treated so as to remove or modify these toughening materials in accord with this invention.

4. Subjecting the legume, whether or not treated so as to reduce the tendency towards tough or hard formations, but preferably when so treated, to more than one, or a series of expansion or explosion procedures, in each of which the expansion or explosion procedure may be substantially less in temperature and pressure conditions than heretofore necessary, but which expansion or explosion procedures in the aggregate will produce the desired more quickly cookable characteristics, but with substantially less scorched flavor, caramelization of sugar, or other harmful characteristics as heretofore produced by the higher intensity of the single explosion procedure, particularly when the starch or protein is not reduced or modified.

5. The use of various accessory procedures as for instance, freezing, cooking, dehydration, steaming, enzymic action, or combinations thereof, and so forth.

6. Subjecting the legumes to a freezing or cooking operation, or to a combination of both, particularly with sufficient water being present, and then dehydrating the legumes, and then subjecting them to a single or multiple explosion procedure.

In the carrying out of this invention, the procedures should be modified or utilized in accord with the type of legume that is being treated. For instance, various procedures are utilized and various results may be obtained from different types of legumes, depending for instance, upon whether the legume contains appreciable amounts of sugar, as, for instance in succulent garden legumes or whether the legume contains relatively little or no sugar, or depending upon whether the product being treated is a starchy or relatively high starch legume or whether it is a relatively non-starchy or low starch legume, and depending upon whether the legume is of an originally relatively high water content or of an originally low water content. These various types of legumes are generally treated differently so as to produce the results that are desired.

Examples of various types of legumes which may be used in accord with this invention are for example, peas, beans, green peas, lentils, velvet beans, lima beans, common beans (string or shell), and so forth.

In carrying out this invention, the starch contained within the legume may be removed partially, or to a larger extent, by various methods, as for instance, by soaking the product in water, hydrochloric acid solutions, alkaline solutions, or other aqueous materials, or by using continuous, single, or repeated washings of these products with water or with these other materials, or by boiling with a sufficient quantity of the aqueous material, or by using enzymes as for instance, diastatic enzymes, or various enzymes to convert the starch into sugar, etc., or by soaking in, or washing with salt solutions, etc., or by various other methods.

Generally, it is advisable, in the removal of the starch, not to boil or heat the starch-containing legume so as to gelatinize or fix the starch therein, but rather it is desirable to wash out the required amount of starch with cold or warm water or other aqueous materials, and thereby so as to keep the starch below its gelatinization point.

In general, the starch removal treatment may consist of any method for partially or wholly changing, modifying, transforming, or converting the starch into a relatively non-gelatinizable product, or into a more readily removable product. Also, any method may be used which will aid in removing, inactivating, or modifying the starch, as for instance, freezing, and particularly, slow freezing so as to rupture the general cell structure.

For example, in many cases the starch material within the legume pieces may be removed more easily, or may be converted into other more easily removable products by the use of various enzymes, ferments, and digestives. For instance, enzymes of a nature of diastase, maltase, invertase, etc., may be utilized for the purpose of aiding in softening and preparing the starch-containing legume so as to produce various qualities. Or, these enzymes may be used to remove the starch by a treatment such as, for instance, placing the food into an aqueous medium containing the enzyme. After the required enzymic action has taken place, this action may be stopped at whatever point is required, as, for example, by heat. In this way the starch may be converted into various sugars, etc., and then more easily dissolved and washed out.

In the carrying out of this embodiment, the procedure may be adjusted so that the starch remaining in the final product will be less than 15% or 20%, or, in many cases, less than 5% or 10%.

Also, other elements that produce hardness or toughness of the legumes, as for instance, the various protein materials contained therein may be converted into different types of products that will not produce this toughness, but preferably they may be washed out either partially or to a larger degree by the use of water, or by various solutions as may be required. They may be washed out or removed either in a converted form but generally in their natural form.

Examples of various protein materials that are contained within various legumes are for example, legumin, vicilin, legumelin, phaseolin, various albumins, or globulins, and so forth.

In the washing out of these materials, and particularly legumin and vicilin, it is desirable to use a salt solution, in view of the fact that these two products are relatively insoluble in water. In case of legumin, a salt solution may be, for example, of a concentration of 2% or over, or a 1% salt solution may be used although this is not so very effective in the dissolving of the legumin. In the case of many proteins, salt concentrations between 8% to 15%, or between 20% and 30%, or over, may be preferred. With reference to vicilin, a salt solution likewise should be used, although generally vicilin is much more soluble in the salt solution than is the case with legumin. Various protein materials, as for instance, proteose, are insoluble in brine but are alkali-soluble, and therefore should be so treated. Also, alcohol, mineral salts, acids, or other required solvents should be used for those protein materials that are better soluble in these other materials.

In view of the nature of many of these products to coagulate, or become fixed within the legume, particularly when heated, as for instance is the case with vicilin, the washing out or the dissolving of these materials should generally take place with cool or warm water and preferably without heat, and also before heat is applied in any of the other procedures of this invention.

With reference to the dissolving or the removing of various proteins, various electrolytic methods may be used in view of the fact that the protein molecule apparently is capable of electrolytic separation or dissociation. Apparently, also, the hydrogen-ion concentration affects the degree of dissociation, and therefore this hydrogen-ion concentration should be regulated for the individual proteins that are treated. Generally, however, at the isoelectric point, the degree of dissociation for various proteins is at a minimum. Various alkaline or acid materials should thereby be used to produce the desired solubility depending upon the type of protein used and the result that it is desired to obtain.

Another procedure for example, that may be used, is the use of proteolytic enzymes such as pepsin or trypsin which may be used to hydrolyze the proteins to proteoses and peptones, and which proteoses and peptones may then be washed out or dissolved in water. If desired, the various peptidases may be used on the proteoses and peptones to further hydrolyze them into amino acids.

In the various cooking or water-soaking or water-washing, etc., operations, it is generally preferred to use soft water instead of hard water in view of the tendency for the lime of hard water to produce insoluble compounds with the proteins of many legumes.

In carrying out this embodiment of the invention, various organisms may also be used as for instance, various types of asperigillus, which apparently produce enzymes that convert insoluble proteins into soluble proteins.

In view of the coagulable nature of many of these protein materials upon the application of heat, these legumes should generally be subjected to the various protein-removal treatments herein described, while the legume is generally in its original fresh condition and generally, at least, prior to their dehydration, or prior to any heat treatment.

Likewise, with reference to legumes containing starch, and particularly relatively high amounts of starch, it is generally advisable to wash out, convert, modify, or remove the required amount of starch therefrom prior to any dehydration, or prior to any heat treatment so as thereby to enable the removal of this material prior to any gelatinizing, coagulation, or fixing, taking place.

However, it is possible, nevertheless, to carry out the starch or protein removal or conversion operation, to some degree and in some cases, to a considerable degree, even after heat has been utilized or gelatinization, coagulation, etc., has taken place.

In fact, in many cases it is advisable to first explode the legume and then to proceed with the starch and/or protein removal or conversion operations. The converting or removing material will then be able to more easily enter within the structure of the legume, and thereby more easily affect the starch or protein material. For this purpose, the explosion procedure may take place either at relatively lower temperatures or pressures, or, it may be desired to use the high temperatures and pressures required for single explosion procedures. Likewise, in various cases, the legume may be treated for starch and/or protein modification or removal, prior to any heat treatment, or prior to any explosion, so as to remove or convert this portion of the starch or protein material, and then, this starch or protein modification or removal procedure may take place again after the explosion procedure, or after each of several explosions.

The conversion, modifying, or removal of the protein, starch, or other hard-quality producing elements is particularly effective with originally relatively high water content legumes, in view of the fact that in originally relatively low water content legumes these protein or starch materials are more firmly fixed and it is substantially harder, and generally various different procedures are required, to produce the results desired.

The toughened or hardened quality of dry legumes is due not only to the heat that is applied, where dehydration takes place, and where the heat results in the fixing or gelatinization or toughening, etc., of the various materials therein, but apparently the quantity of water that is present affects this condition considerably. For instance, relatively high water content legumes, in their original high water condition, have a softness that it is generally difficult to produce after the legumes have first been dried, and then re-hydrated. Likewise, in many cases it is difficult to produce the full tenderness in originally low water content legumes, even by the usual cooking or steaming processes. Apparently, therefore, aside from the factor of heat, this hard or tough quality is produced by lower quantities of water which apparently destroy or harm the individual and soft nature of the protein matter or of the starch grains, etc. Therefore, when only small amounts of moisture are present, a caking or lumping of the starch or protein materials seems to produce the resultant hard or tough quality. This also is another reason why originally high water containing legumes are generally more advantageous in the carrying out of this invention as compared with originally low water content legumes.

In removing the starch or protein materials from the legumes of this invention when these legumes are of a relatively dry or low water nature, it is generally advisable to soak them very thoroughly in cold or warm water, and in many cases in water or aqueous materials that are kept below the gelatinization or coagulation point of the materials therein, so as to place these materials into a relatively softer condition, or so as to put them into a relatively free-celled, or free-particled condition, and thereby so as to enable the solvent or converting material to more readily affect them. With originally low water content legumes, the protein and starch materials apparently are much more firmly and more completely set and more firmly held or toughened within the structure, and generally this additional soaking procedure, or possibly, even a cooking or steaming procedure is advisable.

Likewise, in many cases, a satisfactory method for separating or softening or loosening the particles or cell structure of these starchy or protein materials within the legumes is to soak them or treat them with cold or warm oils as for instance, sesame oil, cottonseed oil, peanut oil and so forth. In many cases long periods of soaking may be desired in order to produce the desired effects.

If the legumes of this invention are not already sufficiently dry, they should be dehydrated prior to the explosion procedure. The water content from the legume, prior to explosion, should be such so as to enable sufficient firmness of structure to enable the required explosion therein.

In carrying out the dehydration of this invention, the legumes may be subjected to any of the various drying methods such as to heat, or hot air, or cold air blasts, at such a temperature and for such a length of time so as to reduce their moisture content, which may run from above 35% to 50% or from above 60% to 70%, to a moisture content below 35% and preferably to a moisture content below 15% to 20%, and in many cases to a moisture content below 8% to 10%.

The legume which is of the proper moisture content is then subjected to an expansion or explosion procedure which will soften, or separate, or disrupt the cell structure, or the entire food structure, and which will thereby produce the quick cookable quality that is desired with substantially better quality than heretofore possible.

The explosion or expansion treatments should usually be carried on at a pressure above 20 or 25 pounds per square inch and preferably above 40 or 50 pounds per square inch, and in some cases it may run as high as 350 or 450 pounds or more per square inch.

With reference to the temperatures that may be utilized, the temperatures are generally above 200° F. to 250° F., and they may run as high as 700° F. or 800° F. or higher. However, generally, the temperature range runs between 350° F. and 550° F.

The required time for explosion may be 10 or 12 minutes, or longer, or it may be under 10 minutes, or it may be even less than several minutes, whereas in many cases it may be under one minute, or, several seconds or 10 to 15 seconds will suffice to complete the treatment and give the best results.

The explosion treatment is carried out for a time period and at a temperature and pressure depending upon a number of factors, as for instance, the moisture within the food material, the softness or hardness of the material, the degree of the expansion or disruption desired, the type of equipment used, whether dry heat or steam or superheated steam is used in the expansion chamber, and also the conditions of time, temperature and pressure will depend upon the variability of these conditions themselves, as well as upon other factors.

If the product to be exploded is a little too dry to enable proper explosion, additional moisture may be added to the product or to the expansion chamber, as for instance, in the form of water or other aqueous materials, or in the form of steam or superheated steam.

This expansion or explosion treatment is generally carried out in a steam atmosphere, and the steam may be developed by various methods, as for instance, from the moisture within the material that is being processed, or by the injection into the pressure chamber of steam, etc.

The equipment that is used for this explosion procedure may be for instance, a pressure gun, or other suitable apparatus which will supply the conditions that are desired.

Although this procedure of explosion, disruption, or expansion may be carried out in one step, it may also be carried out in a plurality of steps, in which case the same, or different temperatures and pressures may be utilized. For example, the material may be subjected to one or two or three explosion or expansion treatments at lower or higher temperatures and pressures, or for the same or varied periods of time.

In many cases, for instance, a multiple expansion procedure at a lower temperature and/or pressure has advantages over a single explosion at a higher temperature and/or pressure in that the legume being treated may be given a still further reduced harshness in treatment, in view of the fact that the higher pressures or temperatures which would be necessary for the single explosion may now be reduced to substantially lower temperatures and pressures. These multiple steps may not produce the degree of cookability required after the first or second or third explosion, but they will produce the desired degree of cookability after the required number of explosions have been effected.

Whereas the multiple explosion procedure is generally preferred in conjunction with the various protein and/or starch removal or conversion procedures as outlined herein, quite unusual results are obtained when the legumes are given this multiple explosion treatment even without the protein and/or starch removal or modification procedures. By carrying through this multiple expansion procedure, even without the starch and protein removal methods, a degree of cookability, without the usual off-flavors and harmed edibility characteristics, may be produced as compared with the usual single explosion procedure, particularly where there is no preliminary treatment given to the starch or protein. Therefore, in the case of legumes, an entirely new result is obtained and it is entirely possible to use the multiple explosion procedure alone, even without the starch or protein removal or other accessory processes, in order to produce substantially enhanced quick cookable legumes as compared with the usual exploded legumes.

In the carrying out of the multiple explosion procedure it is at times advisable to dehydrate the food material after each explosion so as to produce a firmer or harder structure, and so as thereby to enable the desired explosion that is to follow.

It is also desired at times to place a coating on or within the legume so as to permit the formation of harder walls, and thereby, so as to result in a greater or more efficient explosion of the product. Starch, resins, sugars, gums, and similar materials may be used to provide such a coating, as for instance, by mixing these materials with water or aqueous material, and then coating the food pieces and then allowing to dry thereon.

It will in many cases be found, by the multiple explosion treatment, as well as by the single explosion with the accessory treatments herein described, that the cells, or fibers, or body structure of the legume is in a more uniformly disrupted condition, and that it is of a substantially better quality than heretofore possible with the previous single explosion procedure without the accessory treatments of starch or protein removal, with or without freezing, etc. In many cases it will be found that the structure of the legume produced in accord with this invention has formed within it a number of passages and pores, many of which may be greater than capillary size and many which may be of a communicating nature, whereas under single explosion this same result may not be produced with this leguminous type of product.

Because of the increase in the size of these passages and pores there is a substantial increase in the water absorbent or quickly cookable nature of these products, because the cooking water can now more easily enter into the interior portions thereof.

Also, the removal, conversion, or modifying of the protein and/or starch materials from legumes, when followed or preceded by, or when intermingled with the explosion procedure of this invention, produces an entirely new type of quickly disintegratable or quickly cookable legume. Qualities and characteristics heretofore unobtainable with the explosion procedure alone are produced.

After treating the products of this invention in accord with the processes herein described, it is found that the texture, or structure is usually of a relatively changed nature, and that the structure is relatively disrupted either in its body or in its cell structure.

However, heretofore, in the legumes of this invention, this structure disruption, sufficient to provide the required degree of quick cookability, was generally, however, for an intense nature which at the same time destroyed or deteriorated many of the qualities and characteristics of the legume. On the other hand, in many cases, if the intensity of the explosion was such so as not to deteriorate the quality of the food, then, the explosion was not sufficient to produce the quick cookability desired.

For example, heretofore, legumes, as for instance peas, have been given a single explosion treatment at a temperature of about 475° F. for about 45 seconds and under a pressure of 225 pounds per square inch, without the preliminary or accessory treatments herein described. This treatment, while still not sufficiently intense to produce the full quick cookable qualities through- out the entire pea or bean, however is of an intensity that produces a burnt taste, or other disagreeable characteristics to the product, as for instance, some caramelization of the sugar that is present.

However, now, in accord with this invention, these legumes may be processed by the use of procedures herein disclosed, at substantially lower pressures or temperatures so as to produce a substantially quickly cookable product, but with the structure disruption and with the quickly cookable characteristics being present substantially throughout the entire food piece, and with substantially less damaged edibility to the food piece itself.

For example, in place of the excessive pressure noted above where the legume is given a single explosion without the accessory procedures of this invention, there may now be utilized, particularly in conjunction with the multiple explosion procedure, a reduced pressure of about 50 to 60 pounds per square inch, with about the same temperature around 475° F. or even with a lower temperature of 400° F. to 450° F., and with reduced time limits for the exposure which may range from about 20 to 30 seconds.

Of course, the type and nature of the product that is being treated in accord with the processes described herein should be given consideration in controlling the explosion treatment that is used, in view of the fact that different time periods and different temperatures and pressures are required depending upon the nature of the product and the result that is required.

In order to develop and utilize various protectives so as to produce better keeping quality for the legumes, or in order to develop other characteristics, these food materials may be ejected from one or more of the explosion treatments into atmospheres having higher or lower pressures than atmospheric, or into a partial or complete vacuum, or also into various atmospheres that may contain carbon dioxide, nitrogen, ozone, or which may contain oil or aqueous vapors, or they may even be ejected into various liquid or molten oils or fats, or into various aqueous materials, or into sugar syrups, or molten sugars, and so forth.

Also, the explosion procedure of this invention may be so regulated so that the food material will retain substantially its unity following the explosion procedure, rather than having the explosion produce a relatively disintegrated product.

Still further, the food materials of this invention, after they have been exploded, may be ground, or pulverized, or otherwise treated as desired.

Either in their whole condition, or in their ground, or pulverized condition, they may be dipped into, or coated with a plastic or molten fat so as to retard discoloration and so as to produce other enhanced qualities, as instance, higher retention of flavor, better retention of softness in the fibers and cells so as to result in enhanced quicker cookability. Also, the food materials may be coated or treated with molten sugar, or with liquid oils, or with other materials to produce the various effects that are desired.

In the case of food materials that are of a relatively large size, it is generally advisable to cut or break them into relatively smaller pieces before the explosion procedure, so that their interior portions will be better exposed. As a result of cutting or breaking the food materials into smaller portions, there will tend to be formed in the resultant product, a product with more widely distributed pores and exploded portions. Of course, with small pieces as for instance, small peas, the cutting of them is not necessary.

As one embodiment of this invention, the exploded food materials may be coated, impregnated, or otherwise protected with protective materials, and particularly with water repellent materials such as oils and fats, and preferably with fats that are in a plastic or hardened condition at room temperature. However, under various conditions, various other materials or combinations thereof may be used for impregnation, coating, etc., as for instance sugar, preferably when it is of a quickly dissolvable nature.

Examples of fats or oils that may be used in the various embodiments of this invention are for instance hydrogenated cottonseed oil, sesame oil, oleostearin, palm kernel stearin, and so forth.

Fats of a hardened or plastic nature, and also sugar, or various other materials may be used as required as binding agents, where it is desired to form the materials of this invention, either by themselves, or in conjunction with other materials, into cakes, briquettes or other individual units.

The explosion procedure of this invention is particularly adaptable to briquetting, in view of the fact that by the development of the pores of the exploded product, there is then possible a firmer binding together of the materials, in view of the tendency of the binding material to seep into, and anchor itself within the pores, and within the structure of the materials that are being bound together.

The resultant product that is produced as the end product of this invention may be of various moisture contents, but it is generally advisable to have at least 2% to 3% of moisture remain within the final product, or to have above 5% to 8% moisture in the final product in order to enable more ready cookability. This is generally not available when the product is entirely dried out. This also has the advantage of enabling the retention of at least some of the water soluble flavors so as to enhance the flavor element.

Aside from the explosion and accessory procedures herein described, various other accessory procedures may be used in order to enhance the structure, fiber, or cell disruption of the foods, and in order to provide new qualities and characteristics.

For instance, there may be used operations involving soaking, or boiling in oil or fat, roasting in oil, dry roasting, freezing, cooking, steaming, the use of enzymes, boiling or soaking in salt solutions or sugar solutions, or various combinations of these processes.

These procedures may be used at various points as, for instance, preliminary to, after or as an accessory to the explosion, or starch or protein removal operation, so as to further soften the fibers or structure, or so as to aid in dissolving out or converting various materials within the structure, and thereby so as to enhance the production of the desired qualities.

As a possible embodiment of this invention the food pieces may be cooked or steamed to rupture or soften their body or cell structure, and then the food pieces may be dehydrated to a sufficiently low moisture content so as to enable the proper expansion or explosion operation. The cooking or steaming treatment may be carried on for such a period of time so as to produce the required softness.

It is generally preferable in carrying out this embodiment to control the cooking process so as to retain as much as possible of the water soluble flavors and other flavors, essences, and qualities of the food pieces. This is usually done by such methods as cooking, or steaming under vacuum or under pressure, for instance, or in the presence of inert gases such as carbon dioxide, nitrogen and so forth.

Another embodiment of this invention that may be used in order to enhance the softness, or the quick cookable quality, or the disruption, etc., of the products of this invention, is to subject them to a freezing operation, and particularly to a slow freezing operation which will have the effect of rupturing the cells or softening the fiber and cell structure.

In subjecting these materials to a freezing operation, the amount of moisture, and the temperatures that are required in order to produce the best results may vary depending upon the degree of softening and rupturing of the cell structure that is desired, or upon the nature of the food pieces themselves. However, it has been found that good results are usually obtained when the moisture content varies for example over 30% to 40%.

Likewise, it has been found desirable in many cases, to permit the freezing to take place slowly and at temperatures ranging between 0° F. and 32° F., although, in many cases, preferred temperatures run down to minus 20° F. and minus 40° F., and lower. Varying temperatures further may be used for varying lengths of time.

In general it should be said that it is desirable to carry out the freezing treatment in such a way that there will not be the formation of small ice crystals that do not result in rupturing the cells and structure, but rather there should be formed relatively large ice crystals sufficient to puncture, break, rupture or disrupt the cell structure or the body structure substantially throughout the legume piece.

For both the cooking as well as the freezing operations, the water should be present in sufficient amount so that it is carried substantially throughout the food piece, and preferably it should be as uniformly distributed as possible so that the entire structure of the food piece will be affected.

The cooking or freezing procedures in conjunction with the explosion procedure will produce entirely new degrees of softness, quick cookability, and so forth, in the end product.

In many cases it is desirable to combine various of the accessory procedures. For instance, it may be desirable in some cases to first cook or steam the food product as herein described, and then to subject the food to the freezing operation after the cooking procedure.

While the freezing procedure may be used as the only accessory to the explosion operation to produce desired results, nevertheless, a very advantageous application of the freezing operation is with reference to the protein and/or starch removal or conversion procedures. In these cases, the legume may be frozen as herein described so as to rupture the cell structure, and then the legume may be subjected to the starch and/or protein removing operations herein described. Under these conditions there will be a substantially enhanced improvement in the facility with which the starch and/or protein materials may be removed from the legumes, or converted therein.

Following the cooking, freezing, washing, soaking, and other water procedures, the food pieces are then dried, when they are to be followed by the explosion or expansion procedure. This is necessary in order to produce a firmer or a harder structure so as to enable the proper explosion and structure disruption. In the drying procedure various drying methods may be used such as heat or hot air, at such temperatures and for such lengths of time so as to reduce the water content generally to below 30% or 35%, and preferably to below 15% or 20%, and in many cases below 8% to 10%. Following the dehydration procedure, the legumes are then ready for the explosion procedure.

The freezing, cooking, dehydrating, washing, protein and/or starch removing, and explosion procedures, etc., may be varied and intermingled as desired, and as described herein, one or more times, in order to produce the type of product desired.

Also, in the freezing, cooking, or washing, or other procedures of this invention, it is desirable at times, particularly where the food pieces are of relatively large size, to cut them into relatively smaller pieces so as to enable more complete and more thorough penetration of these procedures.

For the drying procedures of the various embodiments of this invention, it is desirable to carry out the procedure in such a way so that the food pieces will oxidize as little as possible. For this reason, the drying may be carried out if desired, under vacuum, or in an atmosphere of carbon dioxide, or nitrogen, or in other inert atmospheres, although of course they may be dried under atmospheric condition if desired.

Instead of drying the food pieces with a dry heat at various points throughout the procedure as herein described, these materials may be placed into a liquid oil or into a molten hard fat and dried to the required moisture content.

As a further embodiment of this invention, the food pieces may be roasted, either dry, or in oil, prior to the explosion procedure, or following the explosion procedure, or following the protein-removing or starch-removing procedures where either are utilized.

The products of this invention may be pulverized, ground or powdered as required.

It is at times desired to remove some of the moisture from the products, prior to powdering, or pulverizing, so as to enhance these particular procedures. While this may be done by the usual heating process, it is many times desirable to remove this moisture, and particularly the surface moisture by immersing the product into a hot fat or hot oil at temperatures which may be above the boiling point of water. When the required amount of moisture has been removed therefrom, the product may then be powdered or treated as desired.

An advantage of drying these materials with fat, and particularly with a molten hard or plastic fat, is that, following this drying procedure, the fat may congeal around the legume pieces immediately after the moisture evaporation has taken place. There will in this way be provided a condition whereby a fat protection will take place immediately after the required moisture has been removed so that relatively little or no oxidation or other deterioration can take place from the time the product has been dried until it is protected with the fat, and so that there will be substantially better keeping quality thereafter.

An embodiment of this invention comprises treating the legume so as to wash out the desired amount of protein, which may have been put into soluble form, and then drying the legume, followed by exploding it, and then permitting the extracted protein to be re-absorbed therein, or coated thereon, and then dried within or on the legume. In this way the protein material is removed to aid in the explosion operation, and, thereafter, it is replaced.

Also, the legume material may be ground or pulverized after the explosion and the extracted protein material which may be in soluble or insoluble form may be mixed and dried therewith.

Likewise, the required amount of sugar may be washed out or removed from the legume prior to explosion to retard caramelization, and then, if desired, this sugar may be re-absorbed into, or coated on the legume.

What I claim is:

1. The process of preparing a relatively quickly cookable dry legume, said process comprising treating the legume by an aqueous solvent to reduce the starch therein, drying the legume, and then subjecting the legume to steam at an elevated temperature and pressure, and thereafter suddenly releasing to a lower temperature and pressure.

2. The process of preparing a relatively quickly cookable dry legume, said process comprising treating the legume by an aqueous solvent to reduce the protein therein, drying the legume, and then subjecting the legume to steam at an elevated temperature and pressure, and thereafter suddenly releasing to a lower temperature and pressure.

3. The process of preparing a relatively quickly cookable dry legume, said process comprising reducing the amount of hard-quality-producing material from within the legume by solubilizing and removing it, drying the legume, and then subjecting the legume to steam at an elevated temperature and pressure, and thereafter suddenly releasing to a lower temperature and pressure, said hard-quality-producing material being selected from a group consisting of protein and starch.

4. The process of preparing a relatively quickly cookable dry legume, said process comprising reducing the amount of hard-quality-producing material from within the legume by aqueous extraction, drying the legume, and then subjecting the legume to steam at an elevated temperature and pressure, and thereafter suddenly releasing to a lower temperature and pressure, said hard-quality-producing material being selected from a group consisting of protein and starch.

5. The process of preparing a relatively quickly cookable dry legume, said process comprising reducing the amount of hard-quality-producing material from within the legume by treating the legume with an enzyme in the presence of sufficient water to produce the enzymic action, stopping the enzymic action at the point required, drying the legume, and then subjecting the legume to steam at an elevated temperature and pressure, and thereafter suddenly releasing to a lower temperature and pressure, said hard-quality-producing materials being selected from a group consisting of protein and starch.

ALBERT MUSHER.